United States Patent
Deese et al.

(10) Patent No.: US 8,001,931 B2
(45) Date of Patent: Aug. 23, 2011

(54) PET FEEDER WITH INSECT REPELLENT

(76) Inventors: Randy C. Deese, Pageland, SC (US);
John H. Clough, Pageland, SC (US)

( * ) Notice: Subject to any disclaimer, the term of this patent is extended or adjusted under 35 U.S.C. 154(b) by 178 days.

(21) Appl. No.: 12/229,632

(22) Filed: Aug. 26, 2008

(65) Prior Publication Data
US 2009/0056636 A1    Mar. 5, 2009

Related U.S. Application Data

(60) Provisional application No. 60/966,705, filed on Aug. 29, 2007.

(51) Int. Cl.
*A01K 39/00*  (2006.01)
(52) U.S. Cl. .................. 119/61.57; 119/51.01; 119/61.5; 248/218.4; 248/227.3
(58) Field of Classification Search .................. 119/61.5, 119/61.53, 61.57, 61.54, 454, 475, 408, 456, 119/464, 467, 515, 521, 57.8; D30/121, D30/129, 133, 124, 125, 131; 248/200, 121, 248/218.4, 219.3, 309.1, 309.2, 219.4, 227.3, 248/250, 230.1, 230.8; 211/87.01, 107, 196, 211/205, 175; 220/475, 481, 476, 480, 482
See application file for complete search history.

(56) References Cited

U.S. PATENT DOCUMENTS

| | | | | |
|---|---|---|---|---|
| 1,358,322 A | * | 11/1920 | McIntosh | 248/300 |
| 2,331,511 A | * | 10/1943 | Schiffman | 43/107 |
| 3,121,419 A | | 2/1964 | Gillespie | |
| 3,441,003 A | * | 4/1969 | Lister et al. | 119/61.53 |
| 3,468,506 A | * | 9/1969 | Curlee | 248/219.3 |
| 3,494,584 A | * | 2/1970 | Dubey | 248/219.4 |
| 3,661,121 A | | 5/1972 | Zielin | |
| 3,664,624 A | * | 5/1972 | Freegard | 248/218.4 |
| 3,995,595 A | * | 12/1976 | Williams | 119/61.53 |
| 4,205,629 A | | 6/1980 | Wix | |
| 4,976,223 A | | 12/1990 | Pierce | |
| 5,054,431 A | | 10/1991 | Coviello | |
| 5,109,800 A | * | 5/1992 | Williams | 119/61.53 |
| 5,165,365 A | | 11/1992 | Thompson | |
| 5,501,176 A | | 3/1996 | Tully | |
| 5,526,773 A | | 6/1996 | Richardson | |
| 5,619,952 A | * | 4/1997 | Walker | 119/61.53 |
| 5,649,386 A | * | 7/1997 | Rynberk | 47/41.14 |
| 5,855,184 A | * | 1/1999 | Eichler et al. | 119/51.5 |
| 6,082,301 A | | 7/2000 | Kramer | |
| 6,227,144 B1 | | 5/2001 | Quintero | |
| 6,622,656 B1 | | 9/2003 | Splane | |
| 6,640,488 B2 | * | 11/2003 | Roberts | 43/109 |
| 6,665,980 B2 | * | 12/2003 | Laske, Jr. | 47/39 |
| 6,860,229 B1 | * | 3/2005 | Craft | 119/61.5 |
| 7,219,622 B1 | * | 5/2007 | Powers | 119/61.53 |
| 2008/0011236 A1 | * | 1/2008 | Paez | 119/61.53 |

* cited by examiner

*Primary Examiner* — David Parsley
*Assistant Examiner* — Danielle Clerkley
(74) *Attorney, Agent, or Firm* — The Law Firm of P. Jeffrey Martin, LLC; P. Jeff Martin

(57) ABSTRACT

A vertically-adjustable pet feeding apparatus is provided which includes a repellent for repelling ants and other insects. The apparatus allows animals, livestock, and pets, such as dogs of various sizes and breeds and of various stages of development, to be provided with food at the proper height. The apparatus is designed to be safe for pets, other animals, and children.

12 Claims, 6 Drawing Sheets

PET FEEDER WITH INSECT REPELLENT

RELATED APPLICATIONS

This application claims the benefit of U.S. Provisional Application No. 60/966,705 filed on Aug. 29, 2007.

BACKGROUND OF THE INVENTION

1. Field of the Invention

The present invention relates generally to feeding apparatuses for animals and, more particularly, to a pet feeder with insect repellent apparatus.

2. Description of the Related Art

Professional dog breeders and others responsible for the care and feeding of animals conventionally utilize a pair of bowls or dishes for feeding purposes. Specifically, one bowl is filled with food while the other is filled with a continuous supply of water. The bowls are generally placed adjacent in a convenient location within the kennel facility. Pet owners utilize a similar arrangement where the bowls are commonly placed adjacent either indoors or outdoors.

However, while professional dog breeders and other animal care takers have long recognized the importance of having the food elevated at a proper height when the dogs or larger animals, such as horses, feed, the average pet owner lacks this knowledge. Pet owners typically place the bowls on the ground, requiring the pet to eat from that level, irrespective of the pet's height.

Thus, for smaller breeds of animals, feeding bowls may be placed at or near ground level, while larger animals should be fed at elevated levels commensurate with their particular size. Significantly larger animals such as livestock and horses would require an even greater feeding elevation.

In addition, with respect to young animals and pets, the elevation of feeding bowls should be increased progressively in order to correspond with the stages of the animals' physical development.

Moreover, because many pet owners place the feeding bowls outdoors on the ground, ants and other insects infest the food and water contained therein.

Accordingly, a need has arisen for a vertically-adjustable pet feeding apparatus which includes a means for repelling ants and other insects, and which is designed to be safe for pets, other animals, and children. The development of the pet feeder with insect repellent fulfills this need.

A search of the prior art did not disclose any patents that read directly on the claims of the instant invention; however, the following references were considered related.

The following patents disclose various pet feeding apparatuses:

U.S. Pat. No. 3,661,121, issued in the name of Zielin;
U.S. Pat. No. 4,205,629, issued in the name of Wix;
U.S. Pat. No. 5,501,176, issued in the name of Tully;
U.S. Pat. No. 4,976,223, issued in the name of Pierce;
U.S. Pat. No. 5,054,431, issued in the name of Covielli;
U.S. Pat. No. 6,082,301, issued in the name of Kramer;
U.S. Pat. No. 5,165,365, issued in the name of Thompson;
U.S. Pat. No. 3,121,419, issued in the name of Gillespie;
U.S. Pat. No. 5,526,773, issued in the name of Richardson;
U.S. Pat. No. 6,227,144 B1, issued in the name of Quintero;
U.S. Pat. No. 6,622,656 B1, issued in the name of Splane; and
U.S. Pat. No. 6,860,229 B1, issued in the name of Craft.

Consequently, a long felt need exists for a vertically-adjustable pet feeder apparatus which repels insects in a manner which is quick, easy, and efficient.

SUMMARY OF THE INVENTION

Therefore, it is an object of the present invention to provide a vertically-adjustable pet feeding apparatus.

It is another object of the present invention to provide a pet feeding apparatus fabricated of rigid materials.

It is another object of the present invention to provide a vertically-adjustable pet feeding apparatus which includes a feeding bowl.

It is another object of the present invention to provide a vertically-adjustable pet feeding apparatus which allows animals, livestock, and pets, such as dogs of various sizes and breeds and of various stages of development, to be provided with food at the proper height.

It is still another object of the present invention to provide a vertically-adjustable pet feeding apparatus which includes a means for repelling ants and other insects, and which is designed to be safe for pets, other animals, and children.

Briefly described according to one embodiment of the present invention, a pet feeder with insect repellent apparatus is disclosed. The apparatus comprises a support bracket to which a feeding bowl is detachably secured. The support bracket is adapted to be mounted to an upright support member via a clevis. The support bracket and clevis conjunctively are adapted to allow the feeding bowl to be vertically adjusted and mounted at a desired height along the upright support member.

The support bracket defines an L-shaped configuration having an anterior end opposing a posterior end. The anterior end of support bracket comprises a cup molded integral thereto. The cup includes an open upper end providing passage into an interior volume into which insect repellent is contained. The cup further includes a circular, tubular abutment element extending integrally and vertically from a center of cup floor. The abutment element includes a threaded bolt mounted coaxially therein and protrudes vertically above an upper edge of abutment element.

The feeding bowl includes a bottom side having a female threaded recess disposed centrally therein. The female threaded recess is adapted to threadedly receive the male threaded end of the threaded bolt of abutment element, thereby removably affixing the feeding bowl to the threaded bolt in a position above the cup. The feeding bowl is rotated until a peripheral edge of the female threaded recess of feeding bowl contacts the upper edge of the abutment element. The abutment element functions to provide an abutment against which the peripheral edge of the female threaded recess of feeding bowl engages, thereby allowing the feeding bowl to be secured spatially above the open upper end of cup. The abutment element defines a height adapted to provide an optimum vertical space between the bottom side of the feeding bowl and the open upper end of cup when feeding bowl is tightened onto the male threaded end of the threaded bolt of the abutment element. The vertical space is adapted to provide an opening sufficiently sized so as to concurrently allow the insect repellent to aerate in order to repel insects, and to prevent accidental contact with insect repellent by pet paws, pet noses, and fingers of curious children.

A first alternate embodiment comprises a support bracket adapted to be mounted to an upright support member via a clevis, the support bracket defines an L-shaped configuration having an arcuate anterior end opposing a posterior end. The support bracket includes a male threaded member molded integral to or mounted such as by welding atop an upper surface of the support bracket proximal the anterior end thereof. The male threaded member functions as a post for retaining a cap and for providing a means by which a feeding bowl may be removably affixed to the support bracket.

The cap is adapted to be removably supported atop the anterior end of support bracket, the cap includes an interior volume adapted to contain insect repellent.

A second alternate embodiment comprises a pet feeder with insect repellent apparatus designed and configured to be free-standing. The apparatus is adapted to rest stationary atop a generally flat surface, such as a patio, without requiring the use of a support bracket. The apparatus comprises a circular base which includes an upper surface and a lower surface, the upper surface comprises an annular wall molded integral to upper surface about an elongated centerline thereof. The annular wall extends vertically from the upper surface and has an open upper end providing passage into an interior volume adapted to contain insect repellent.

The apparatus further comprises a circular, tubular abutment element extending integrally and vertically from a center of annular wall floor. The abutment element includes a threaded bolt mounted coaxially therein and protrudes vertically above an upper edge of abutment element. The female threaded recess of the feeding bowl is threadedly engaged with the male threaded end of the threaded bolt of abutment element, thereby removably affixing the feeding bowl to the threaded bolt in a position spatially above the annular wall.

The use of the present invention allows animals, livestock, and pets, such as dogs of various sizes and breeds and of various stages of development, to be provided with food at the proper height, and which repels insects in a manner which is safe, quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
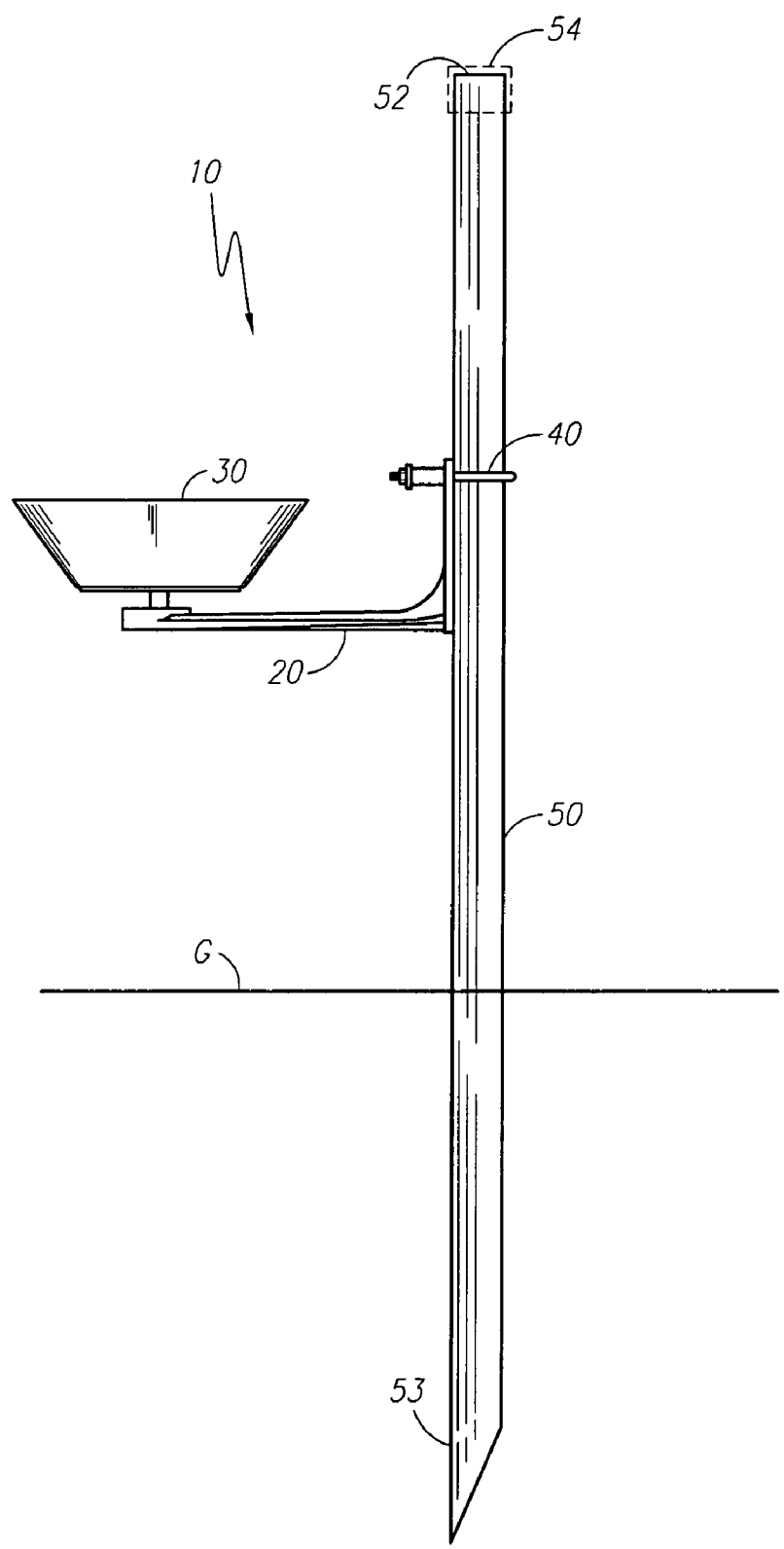
FIG. 1 is a side elevational view of a pet feeder with insect repellent apparatus, according to the preferred embodiment of the present invention.
Figure 2:
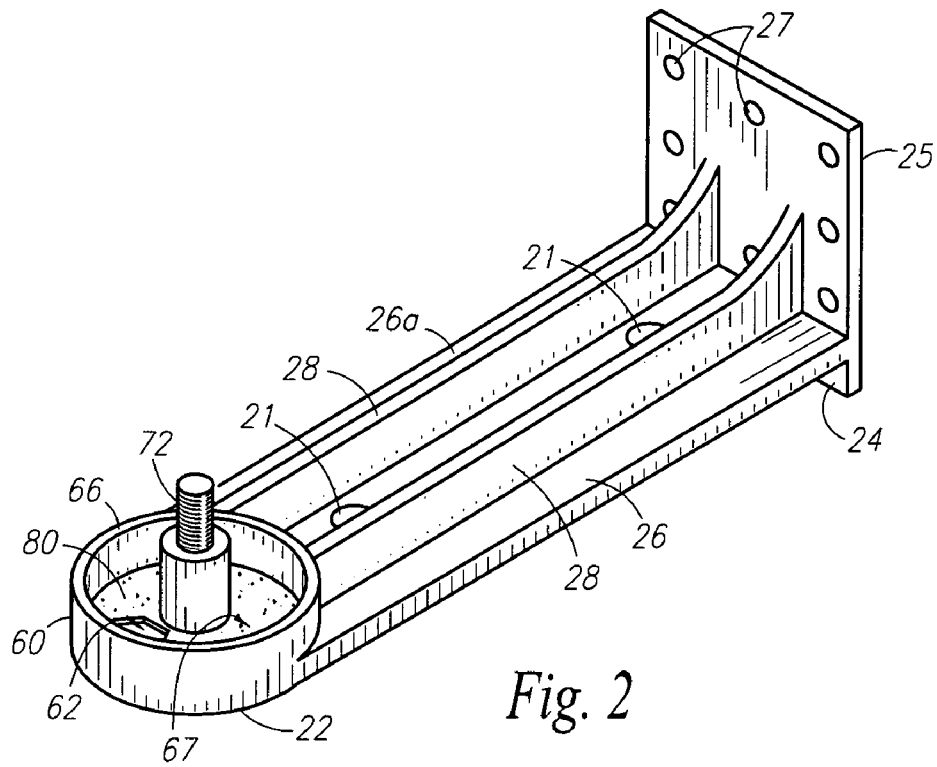
FIG. 2 is a top perspective view of a support bracket, according to the preferred embodiment of the present invention.

Referring now to FIG. 1, a pet feeder with insect repellent apparatus 10, is shown, according to the present invention, configured to allow animals, livestock, and pets, such as dogs of various sizes and breeds and of various stages of development to be provided with food at the proper height. The pet feeder with insect repellent apparatus 10, hereinafter apparatus 10, comprises a support bracket 20 to which a feeding bowl 30 is detachably secured. The support bracket 20 is adapted to be mounted to an upright support member 50 via a mounting means 40, such as a clevis 41 or U-shaped pin. The support bracket 20 and clevis 41 (to be described later in greater detail) conjunctively are adapted to allow the feeding bowl 30 to be vertically adjusted and mounted at a desired height along the upright support member 50. The feeding bowl 30 and the support bracket 20 are each envisioned to be constructed of a rigid material such as stainless steel, galvanized steel, aluminum, plastic, plastic polymer, or wood so as to provide characteristics of strength and rigidity.

The upright support member 50 defines an elongated configuration having an upper end 52 opposing a lower end 53, wherein lower end 53 may be tapered so as to facilitate insertion into the ground G, as shown in FIG. 1. The upright support member 50 is envisioned to define a length of approximately forty-eight inches, however, the length of upright support member 50 may be readily determinable by the manufacturer in accordance with intended use. Upright support member 50 may include a protective cap 54 disposed atop the upper end 52 thereof.

Referring now to FIGS. 1-8, and 10, according to the preferred embodiment, support bracket 20 defines an L-shaped configuration having an anterior end 22 opposing a posterior end 24. The posterior end 24 comprises a vertical planar plate 25 integrally joined by an elongated arm 26 extending perpendicularly therefrom proximal a lower end of vertical planar plate 25. The arm 26 includes an upper surface 26*a* opposing a lower surface 26*b*. Arm 26 converges slightly inward with increased distance from the vertical planar plate 25. The vertical planar plate 25 has a face 25*a* opposing a back 25*b* and includes a plurality of spatially-aligned apertures 27 defined therethrough and oriented proximally about a peripheral edge of vertical planar plate 25. The spatially-aligned apertures 127 are sized and spaced to receive threaded ends 42 of clevis 41.

Figure 3:
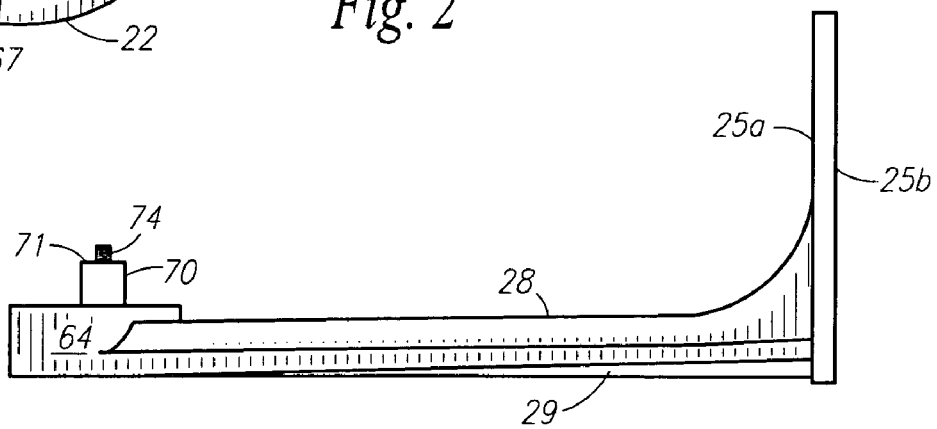
FIG. 3 is a side elevational view of the support bracket of FIG. 2.
Figure 4:
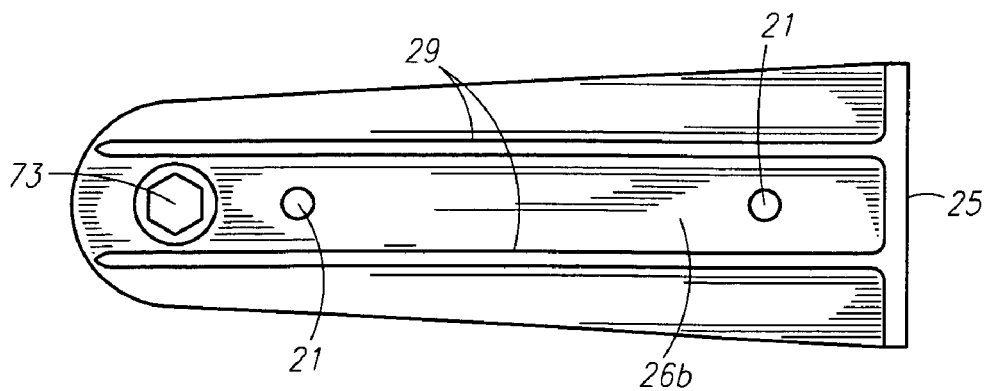
FIG. 4 is a bottom plan view of the support bracket of FIG. 2 and FIG. 3.
Figure 5:
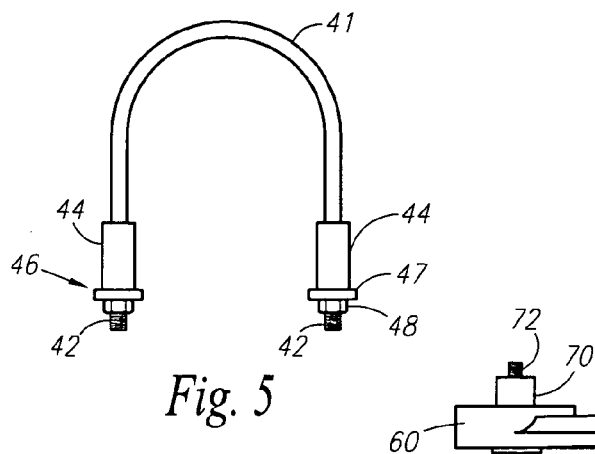
FIG. 5 is a top plan view of a clevis, according to the preferred embodiment of the present invention.
Figure 6:
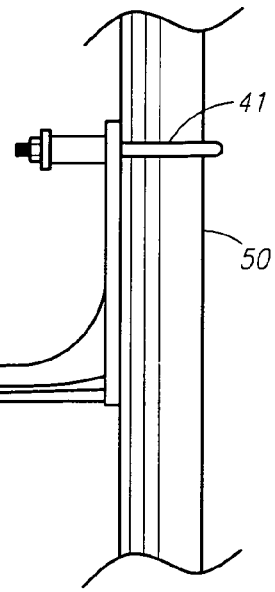
FIG. 6 is a side elevational view of the support bracket shown attached to an upright support member, according to the preferred embodiment of the present invention.
Figure 7:
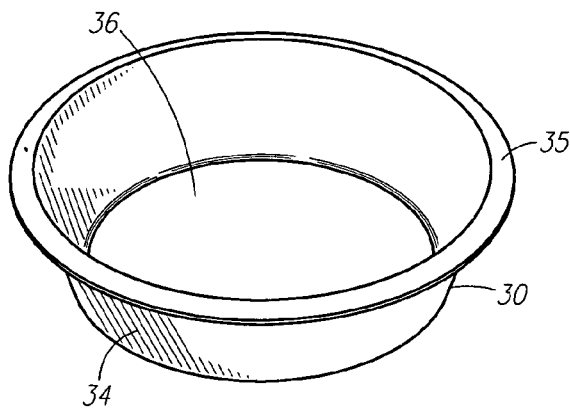
FIG. 7 is a perspective view of a feeding bowl, according to the preferred embodiment of the present invention.
Figure 8:
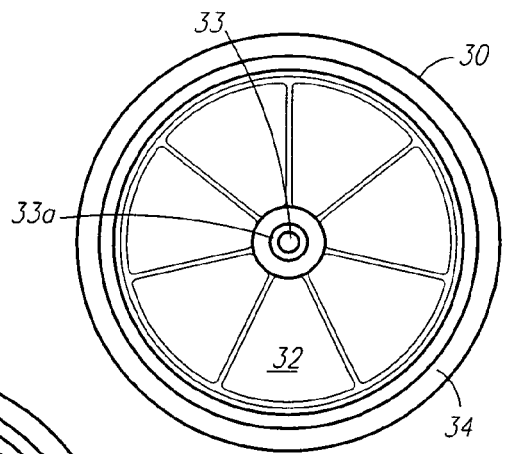
FIG. 8 is a bottom plan view of the feeding bowl of FIG. 7 illustrating the female threaded recess, according to the preferred embodiment of the present invention.

The anterior end 22 of support bracket 20 comprises a cup 60 molded integral thereto. Cup 60 comprises a circular floor 62 from which a sidewall 64 extends vertically therefrom forming a circular perimeter thereabound. The cup 60 further comprises an open upper end 66 providing passage into an interior volume 67. Cup 60 further includes a circular, tubular abutment element 70 extending integrally and vertically from a center of circular floor 62. Abutment element 70 defines a greater vertical length than a vertical length defining the sidewall 64 of cup 60. Thus, abutment element 70 extends above the open upper end 66 of cup 60, as shown in FIG. 3. Abutment element 70 includes a threaded bolt 72 mounted coaxially therein and protrudes vertically above an upper edge 71 of abutment element 70. More specifically, threaded bolt 72 includes a head 73 and a male threaded end 74, wherein the threaded end 74 protrudes above the upper edge 71 of abutment element 70.

In order to enhance the structural integrity of support bracket 20, a first pair of lists 28 are molded integral to the upper surface 26a of arm 26. The first pair of lists 28 is oriented parallel and extends from a lower portion of a face 25a of vertical planar plate 25 to the sidewall 64 of cup 60. A second pair of lists 29 is molded integral to the lower surface 26b of arm 26. The second pair of lists 29 is oriented parallel and extends from a bottom edge of the face 25a of vertical planar plate 25 to the anterior end 22 of arm 26. Arm 26 further includes a plurality of holes 21 defined through the upper surface 26a thereof, wherein holes 21 are spatially positioned between the first and second pair of lists 28, 29.

The clevis 41 defines a U-shaped configuration having threaded ends 42. To mount support bracket 20 to the upright support member 50, the back 25b of vertical planar plate 25 is engaged and held stationary against an external sidewall of upright support member 50 along a desired vertical position there along. The threaded ends 42 of clevis 41 are directed circumferentially around an opposite external sidewall of upright support member 50 and inserted through corresponding apertures 27 in vertical planar plate 25. To facilitate taut mounting of support bracket 20 to upright support member 50, an elongated, tubular sleeve 44 serving as a spacer mates with each threaded end 42 of clevis 41. The tubular sleeves 44 are adapted to be slidably received by the threaded ends 42. A fastener assembly 46 comprising washers 47 and bolts 48 is provided to securely mount support bracket 20 to upright support member 50. A washer 47 is received by each threaded end 42 and positioned against each tubular sleeve 44, followed by a bolt 48 which threadedly engages each threaded end 42 until tight.

The feeding bowl 30 includes a bottom side 32 from which a sidewall 34 extends circumferentially upward therefrom into an open top 35. The open top 35 provides passage into a cavity 36 into which food or water (not shown) is containable. The bottom side 32 of bowl 30 includes a female threaded recess 33 disposed centrally therein. The female threaded recess 33 is adapted to threadedly receive the male threaded end 74 of threaded bolt 72.

Figure 9:
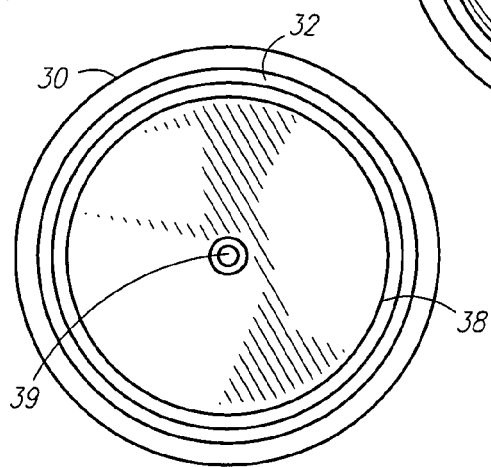
FIG. 9 is a bottom plan view of a feeding bowl, according to an alternate embodiment, illustrating a circular plate mounted to a bottom side thereof.
Figure 10:
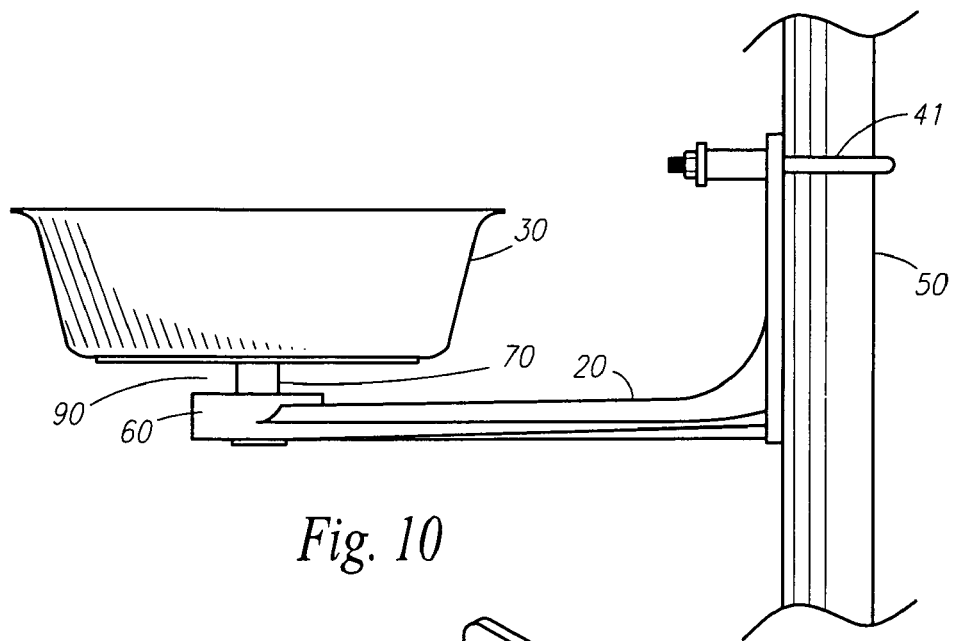
FIG. 10 is a side elevational view of the present invention showing feeding bowl removably affixed to support bracket, and support bracket mounted to upright member, according to the preferred embodiment.

In an embodiment where feeding bowl 30 is constructed of a metal such as stainless steel or galvanized steel, the bottom side 32 of bowl 30 is mounted with a circular plate 38 (shown in FIG. 9). The circular plate 38 includes a female threaded recess 39 defined centrally therein, the female threaded recess 39 is adapted to threadedly engage the male threaded end 74 of threaded bolt 72.

The interior volume 67 of cup 60 is adapted to contain insect repellent 80. Approximately one teaspoon or five grams of insect repellent 80 is evenly distributed within the interior volume 67 of cup 60. Insect repellent 80 is preferably a composition comprising permethrin, the composition sold commercially under the trademark HI-YIELD® 5% Carbaryl Garden & Pet Dust. HI-YIELD® 5% Carbaryl Garden & Pet Dust is registered as number 7401-69 by The U.S. Environmental Protection Agency (EPA).

Alternatively, insect repellent 80 may be defined as including any one of the following: mint, mint extract, soapy water, and sevin dust pesticide. After placing insect repellent 80 within cup 60, the female threaded recess 33 of the feeding bowl 30 threadedly engages the male threaded end 74 of threaded bolt 72. More simply stated, the feeding bowl 30 is screwed onto the male threaded end 74 of threaded bolt 72 until tight, thereby removably affixing feeding bowl 30 to threaded bolt 72 in a position above cup 60. The feeding bowl 30 is rotated until a peripheral edge 33a of female threaded recess 33 contacts the upper edge 71 of abutment element 70. Abutment element 70 affords important functional utility to the present invention and is critical thereto. Abutment element 70 functions to allow feeding bowl 30 to be removably affixed to support bracket 20, in addition to providing an abutment against which the peripheral edge 33a of female threaded recess 33 of feeding bowl 30 engages, thereby allowing feeding bowl 30 to be secured spatially above the open upper end 66 of cup 60. Abutment element 70 defines a height adapted to provide an optimum vertical space 90 between a bottom side 32 of feeding bowl 30 and the open upper end 66 of cup 60 when feeding bowl 30 is tightened onto the male threaded end 74 of threaded bolt 72. The vertical space 90 is defined as having a height of approximately 0.25 inches. The vertical space 90 is adapted to provide an opening sufficiently sized so as to concurrently allow the insect repellent 80 to aerate in order to repel insects, particularly ants, and to prevent accidental contact with insect repellent 80 by pet paws, pet noses, and fingers of curious children (not shown). Feeding bowl 30 is shown removably affixed to support bracket 20 and support bracket 20 mounted to upright support member 50 in FIG. 10.

Figure 11:
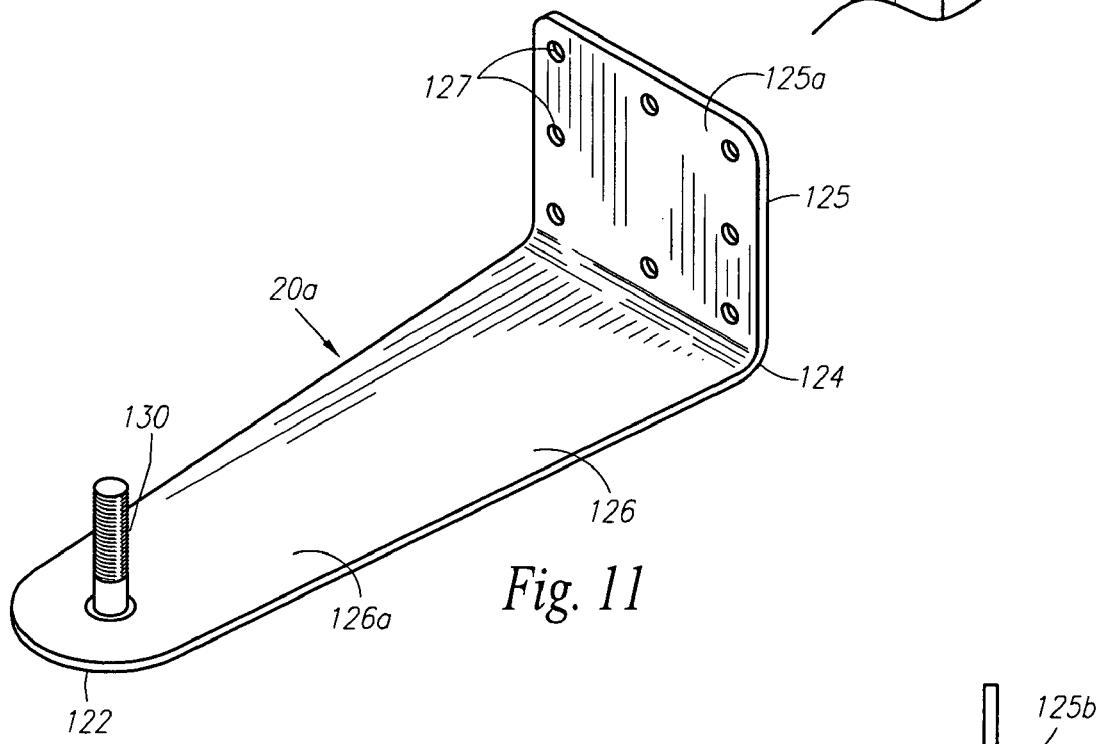
FIG. 11 is a top perspective view of a support bracket, according to an alternate embodiment of the present invention.
Figure 12:
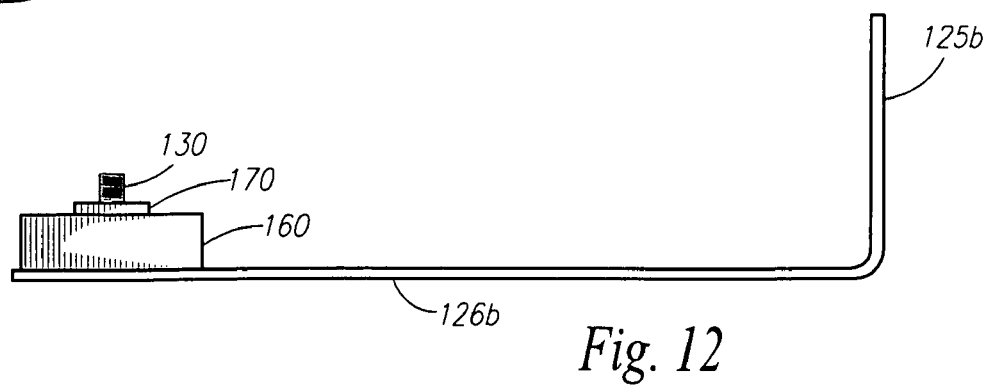
FIG. 12 is a side elevational view of the support bracket of FIG. 11, showing a cap positioned thereatop.
Figure 13:
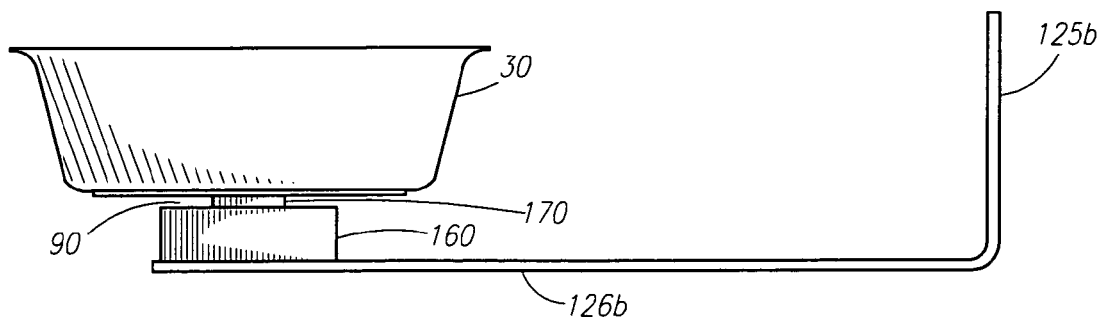
FIG. 13 is a side elevational view of the support bracket of FIG. 11 and FIG. 12, illustrating a feeding bowl removably affixed thereto.
Figure 14:
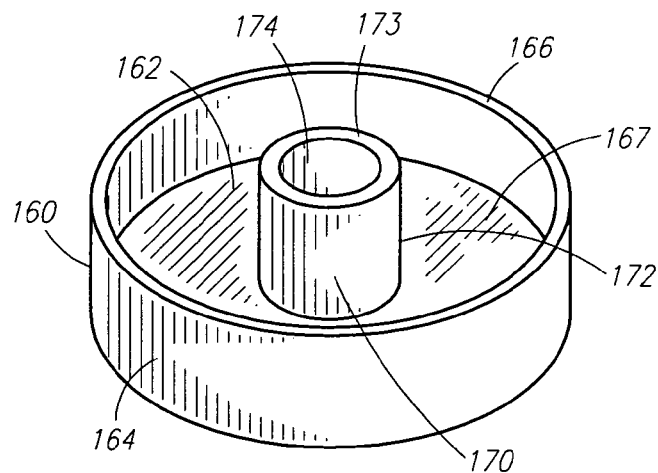
FIG. 14 is a top perspective view of the cap of FIG. 12.
Figure 15:
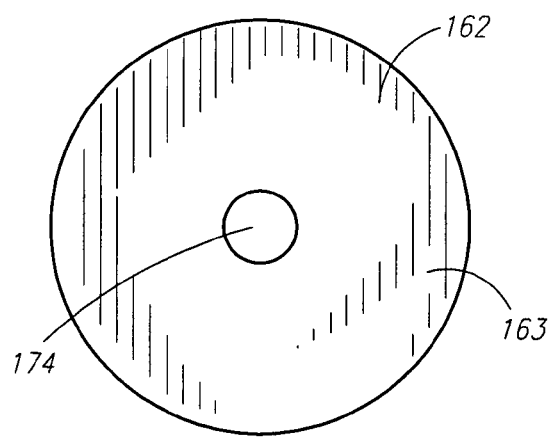
FIG. 15 is a bottom plan view of the cap of FIG. 14.

Referring now to FIGS. 11-13, an alternate embodiment is provided wherein support bracket 20a defines an L-shaped configuration having an arcuate anterior end 122 opposing a posterior end 124. The posterior end 124 comprises a vertical planar plate 125 integrally joined by an elongated arm 126 extending perpendicularly from a lower end of vertical planar plate 125. The arm 126 includes an upper surface 126a opposing a lower surface 126b. Arm 126 converges slightly inward with increased distance from the vertical planar plate 125. The vertical planar plate 125 has a face 125a opposing a back 125b and includes a plurality of spatially-aligned apertures 127 defined therethrough and oriented proximally about a peripheral edge of vertical planar plate 125. The apertures 127 are sized and spaced to receive the threaded ends 42 clevis 41.

A male threaded member 130 is molded integral to or mounted such as by welding atop the upper surface 126a of arm 126 proximal the anterior end 122, and about an elongated centerline thereof. The male threaded member 130 extends vertically from the upper surface 126a of arm 126. Male threaded member 130 functions as a post for retaining a cap 160 and for providing a means by which a feeding bowl 30 may be removably affixed to support bracket 20a.

The support bracket 20a is adapted to be mounted to an upright support member 50 via the clevis 41 in the same manner described hereinabove concerning the preferred embodiment.

Referring now more specifically to FIGS. 12-15, the cap 160 comprises a circular floor 162 from which a sidewall 164 extends vertically therefrom forming a circular perimeter thereabound. The cap 160 further comprises an open upper end 166 providing passage into an interior volume 167. Cap 160 further includes a circular, tubular abutment element 170 extending integrally and vertically from a center of circular floor 162. Abutment element 170 defines an elongated, cylindrical body 172 having an upper edge 173 providing passage into an elongated circular void 174. Abutment element 170 defines a greater vertical length than a vertical length defining the sidewall 164 of cap 160. Thus, abutment element 170 extends above the open upper end 166 of cap 160, as shown in FIG. 12.

The cap 160 is adapted to rest atop the anterior end 122 of support bracket 20a. More specifically, the elongated circular void 174 of abutment element 170 provides a hole through which the male threaded member 130 is inserted. The cap 160 is positioned atop support bracket 20a in a manner such that a bottom side 163 of the floor 162 thereof contacts the upper surface 126a of the arm 126 along the anterior end 122 thereof, as illustrated in FIG. 12.

The interior volume 167 of cap 160 is adapted to contain insect repellent 80. A quantity of insect repellent 80 is evenly distributed within the interior volume 167 of cap 160. In order to removably affix feeding bowl 30 to support bracket 20a, the female threaded recess 33 of feeding bowl 30 threadedly engages male threaded member 130 in a position above cap 160. The feeding bowl 30 is rotated until a peripheral edge 33a of the female threaded recess 33 thereof contacts the upper edge 173 of abutment element 170. In this configuration, feeding bowl 30 is removably secured spatially above the open upper end 166 of cap 160. Abutment element 170 defines a height adapted to provide an optimum vertical space 90 between a bottom side 32 of feeding bowl 30 and the open upper end 166 of cap 160 when feeding bowl 30 is tightened onto the male threaded member 130. The vertical space 90 is defined as having a height of approximately 0.25 inches. The vertical space 90 is adapted to provide an opening sufficiently sized so as to concurrently allow the insect repellent 80 to aerate in order to repel insects, particularly ants, and to prevent accidental contact with insect repellent 80 by pet paws, pet noses, and fingers of curious children (not shown). Feeding bowl 30 is shown removably affixed to support bracket 20a in FIG. 13.

Figure 16:
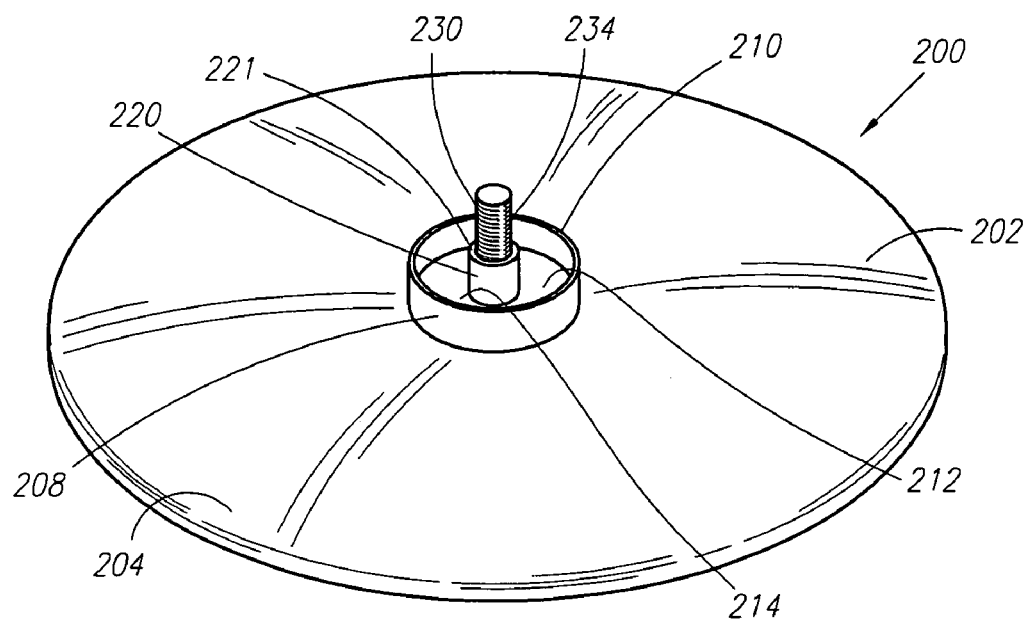
FIG. 16 is a perspective view of an additional alternate embodiment of the present invention.
Figure 17:
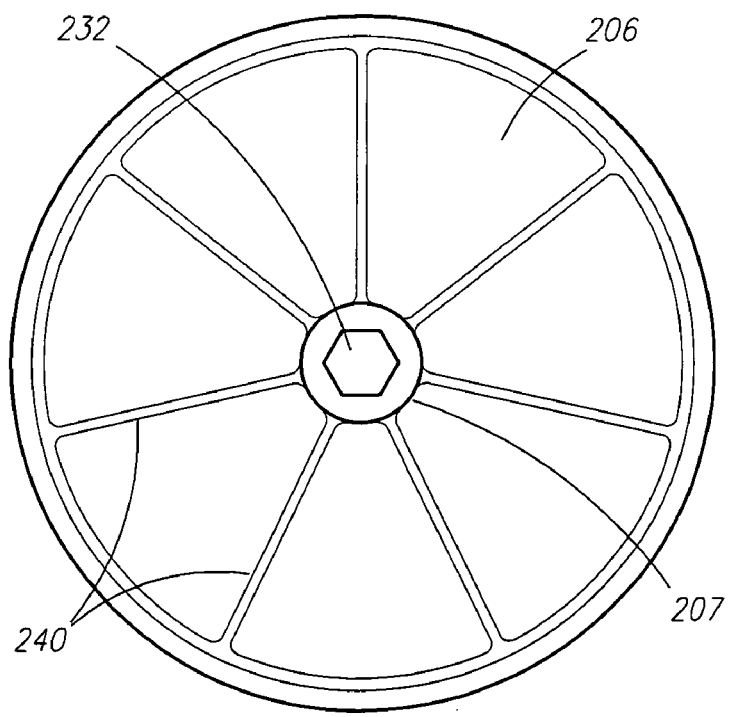
FIG. 17 is a bottom plan view of FIG. 16.

Finally, referring to FIGS. 16-17, another alternate embodiment is provided, wherein a pet feeder with insect repellent apparatus 200 comprises a circular base 202. The base 202 includes an upper surface 204 and a lower surface 206, the upper surface 204 comprises an annular wall 208 molded integral to upper surface 204 about an elongated centerline thereof. The upper surface 204 is sloped slightly downward radially from the annular wall 208 to a perimeter of base 202, thereby facilitating water drain or runoff therefrom. The annular wall 208 extends vertically from the upper surface 204 and has an open upper end 210 providing passage into an interior volume 212. The upper surface 204 provides a floor 214 from which annular wall 208 extends vertically therefrom forming a circular perimeter therearound.

The lower surface 206 of base 202 comprises a central hub 207 from which a plurality of lists 240 integrally extend radially therefrom. The lists 240 enhance the structural integrity of the base 202. The lists 240 are spatially aligned and extend longitudinally from the central hub 207 of the lower surface 206 of base 202 and terminate along a perimeter thereof. The lists 240 are arranged at an angular distance from one another.

The apparatus 200 further comprises a circular, tubular abutment element 220 extending integrally and vertically from a center of floor 214. Abutment element 220 defines a greater vertical length than a vertical length defining the annular wall 208. Thus, abutment element 220 extends above the open upper end 210 of annular wall 208. Abutment element 220 includes a threaded bolt 230 mounted coaxially therein and protrudes vertically above an upper edge 221 of abutment element 220. More specifically, threaded bolt 230 includes a head 232 and a male threaded end 234, wherein the threaded end 234 protrudes above the upper edge 221 of abutment element 220.

The interior volume 212 is adapted to contain insect repellent 80. A quantity of insect repellent 80 is evenly distributed within the interior volume 212 formed by annular wall 208 and floor 214. The female threaded recess 33 of the feeding bowl 30 is threadedly engaged with the male threaded end 234 of threaded bolt 230, thereby removably affixing feeding bowl 30 to threaded bolt 230 in a position above annular wall 208. The feeding bowl 30 is rotated until a peripheral edge 33a of female threaded recess 33 contacts the upper edge 221 of abutment element 220. Abutment element 220 functions to allow feeding bowl 30 to be removably affixed to the apparatus 200, in addition to providing an abutment against which the peripheral edge 33a of female threaded recess 33 of feeding bowl 30 engages, thereby allowing feeding bowl 30 to be secured spatially above the open upper end 210 of annular wall 208. Abutment element 220 defines a height adapted to provide an optimum vertical space 90 between a bottom side 32 of feeding bowl 30 and the open upper end 210 of annular wall 208 when feeding bowl 30 is tightened onto the male threaded end 234 of threaded bolt 230. The vertical space 90 is defined as having a height of approximately 0.25 inches. The vertical space 90 is adapted to provide an opening sufficiently sized so as to concurrently allow the insect repellent 80 to aerate in order to repel insects, particularly ants, and to prevent accidental contact with insect repellent 80 by pet paws, pet noses, and fingers of curious children.

The pet feeder with insect repellent apparatus 200 is designed and configured to be free-standing. The apparatus 200 is adapted to rest stationary atop a generally flat surface, such as a patio, without requiring the use of a support bracket 20, 20a.

The use of the present invention allows animals, livestock, and pets, such as dogs of various sizes and breeds and of various stages of development, to be provided with food at the proper height, and which repels insects in a manner which is safe, quick, easy, and efficient.

It is further envisioned that the various elements and features described and disclosed may be arranged in a variety of configurations, including those not explicitly disclosed but envisioned through the combinations that may be generated by the various elements and features. Therefore, it is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A pet feeder apparatus comprising:
    a support bracket, the support bracket is adapted to be mounted to an upright support member, wherein the support bracket defines an L-shaped configuration having an anterior end opposing a posterior end, the anterior end comprises a cup, the posterior end comprises a vertical planar plate integrally joined by an elongated arm extending perpendicularly therefrom proximal a lower end of the vertical planar plate, the arm includes an upper surface opposing a lower surface, the arm converges slightly inward with increased distance from the vertical planar plate, the vertical planar plate has a face opposing a back, the vertical planar plate includes a plurality of spatially-aligned apertures defined therethrough and oriented proximally about a peripheral edge of the vertical planar plate, wherein the support bracket includes a first pair of lists molded integral to the upper surface of the arm thereof, the first pair of lists is oriented parallel and extends from a lower portion of the face of the vertical planar plate to the sidewall of the cup, and wherein the support bracket further includes a second pair of lists molded integral to the lower surface of the arm, the second pair of lists is oriented parallel and extends from a bottom edge of the face of the vertical planar plate to the anterior end of the support bracket, the arm has a plurality of holes defined through the upper surface thereof, wherein the plurality of holes are spatially positioned between the first pair of lists and the second pair of lists;
    a feeding bowl, the feeding bowl is detachably securable to the support bracket;
    a means for mounting the support bracket to the upright support member, the support bracket and the mounting means function conjunctively to allow the feeding bowl to be vertically adjusted and mounted at a desired height along the upright support member; and
    an insect repellent.

2. The pet feeder apparatus of claim 1, wherein the means for mounting the support bracket to the upright support member is a clevis, the clevis defines a U-shaped configuration having threaded ends, the clevis includes a pair of elongated, tubular sleeves slidably received by the threaded ends of the clevis.

3. The pet feeder apparatus of claim 1, wherein the back of the vertical planar plate is engaged and held stationary against an external sidewall of the upright support member along a desired vertical position there along, the threaded ends of clevis are directed circumferentially around an opposite external sidewall of the upright support member and inserted through corresponding the spatially-aligned apertures via the back of the vertical planar plate, the pair of elongated, tubular sleeves mate with corresponding threaded ends of a clevis in order to facilitate taut mounting of the support bracket to the upright support member, the support bracket is securely mounted to the upright support member via a fastener assembly.

4. The pet feeder apparatus of claim 1, wherein the feeding bowl includes a bottom side from which a sidewall extends circumferentially upward therefrom into an open top, the open top provides passage into a cavity into which food or water is containable, the bottom side of the feeding bowl includes a female threaded recess disposed centrally therein, the female threaded recess having a peripheral edge, the female threaded recess threadedly receives the male threaded end of the threaded bolt of the abutment element of the cup, thereby allowing the feeding bowl to be removably secured spatially above an open upper end of the cup.

5. The pet feeder apparatus of claim 4, wherein the female threaded recess threadedly mates with the male threaded end of the threaded bolt of the abutment element, and the feeding bowl is rotated until the peripheral edge of the female threaded recess contacts the upper edge of the abutment element, wherein the abutment element allows the feeding bowl to be removably affixed to the support bracket and further provides an abutment against which the peripheral edge of the female threaded recess of the feeding bowl is engaged, thereby allowing the feeding bowl to be secured spatially above the open upper end of the cup.

6. The pet feeder apparatus of claim 5, wherein the abutment element defines a height adapted to provide an optimum vertical space between the bottom side of the feeding bowl and the open upper end of the cup when the feeding bowl is tightened onto the male threaded end of the threaded bolt of the abutment element.

7. The pet feeder apparatus of claim 6, wherein the vertical space is defined as having a height of approximately 0.25 inches, the vertical space is adapted to provide an opening sufficiently sized so as to concurrently allow the insect repellent to aerate in order to repel insects, and to prevent accidental contact with the insect repellent by pet paws, pet noses, and fingers of curious children.

8. The pet feeder apparatus of claim 1, wherein the feeding bowl and the support bracket are constructed of a rigid material.

9. The pet feeder apparatus of claim 1, wherein the cup comprises:
    a circular floor from which a sidewall extends vertically therefrom forming a circular perimeter therearound;
    an open upper end providing passage into an interior volume, the interior volume is adapted to contain a quantity of the insect repellent; and
    a circular, tubular abutment element extending integrally and vertically from a center of the circular floor, the abutment element has an upper edge, the abutment element defines a greater vertical length than a vertical length defining the sidewall of the cup.

10. The pet feeder apparatus of claim 9, wherein the abutment element includes a threaded bolt mounted coaxially therein and protrudes vertically above the upper edge of the abutment element, the threaded bolt includes a head and a male threaded end, wherein the male threaded end protrudes above the upper edge of abutment element.

11. The pet feeder apparatus of claim 9, wherein the insect repellent is a composition comprising permethrin.

12. The pet feeder apparatus of claim 9, wherein the quantity of the insect repellent is approximately 5.0 grams.

* * * * *